June 5, 1945.  H. V. LEA ET AL  2,377,347
PLOW ASSEMBLY FOR BEET HARVESTERS
Filed Jan. 31, 1944
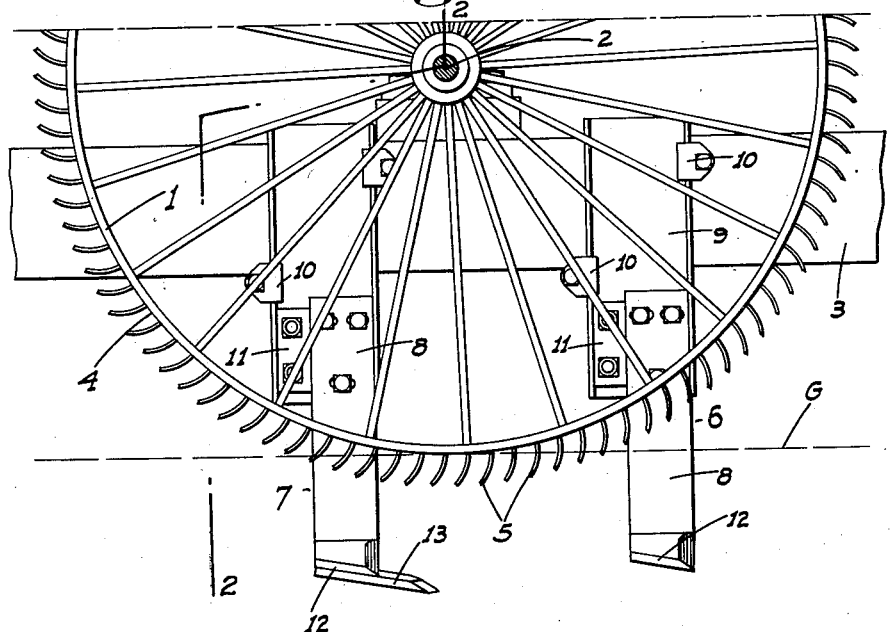
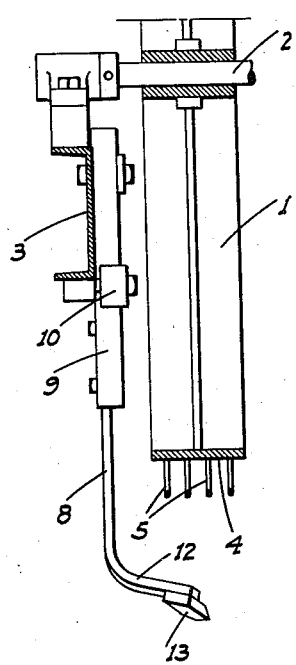
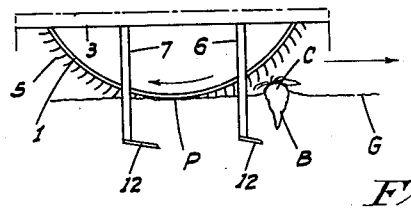
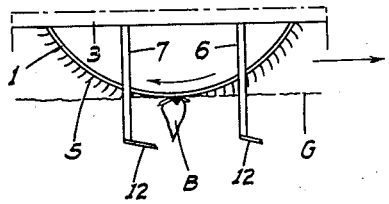
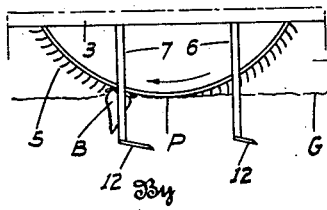
Inventors
Henry V. Lea
Lewis W. Schmidt Patented June 5, 1945

2,377,347

UNITED STATES PATENT OFFICE 2,377,347

PLOW ASSEMBLY FOR BEET HARVESTERS

Henry V. Lea and Lewis W. Schmidt, Rio Vista, Calif., assignors of twenty-one and one-fourth per cent to Claude A. Loucks, thirty-six and one-fourth per cent to Lloyd K. Schmidt, twenty-one and one-fourth per cent to Albert M. Jongeneel, and twenty-one and one-fourth per cent to George P. du Bose Application January 31, 1944, Serial No. 520,386

10 Claims. (Cl. 55—108)

This invention relates in general to an improved plow assembly for beet harvesters, and in particular is directed to, and it is an object to provide, said plow assembly in a beet harvester, such as shown in United States Patent No. 2,350,173, and which includes a spiked, beet pick-up wheel.

Another object of the invention is to provide a plow assembly which, when arranged in combination with a spiked, beet pick-up wheel of a harvester of the identified type, is operative to condition the soil about the beets to be harvested so as to facilitate pick-up of said beets by the spiked harvesting wheel.

A further object of the invention is to provide a plow assembly, as above, which includes a lead plow disposed to disturb the earth below and about the beets in a row in advance of the spiked, beet pick-up wheel whereby those beets whose crowns are above ground level are vertically depressed into the disturbed earth to a flush position and consequently impaled substantially radially of the wheel on the spikes thereof, as is desirable for effective topping and stripping operations. The improved plow assembly avoids the tendency of "high crown" beets to tilt, under the advancing movement of the spiked, beet pick-up wheel, to one side or the other and impale on said wheel at a corresponding angle, which reduces the effectiveness of the topping unit, as shown in the identified copending application, which functions best when the beets are impaled substantially radially on the wheel.

A further object of the invention is to produce a simple and inexpensive device, and yet one which will be exceedingly effective for the purpose for which it is designed.

These objects we accomplish by means of such structure and relative arrangement of parts as will fully appear by a perusal of the following specification and claims.

In the drawing similar characters of reference indicate corresponding parts in the several views:

Figure 1 is a fragmentary side elevation of a spiked, beet pick-up wheel assembly of a beet harvester, including the improved plow assembly.

Figure 2 is a cross section on line 2—2 of Figure 1.

Figures 3-5, inclusive, are diagrammatic side elevations of the plow assembly in successive steps of operation relative to an initially "high crown" beet.

Referring now more particularly to the characters of reference on the drawing, the invention is incorporated in a beet harvester which includes a relatively large diameter beet pick-up wheel 1 which is carried on a cross shaft 2 journaled on opposite sides of the wheel on transversely spaced frame beams, one of which is shown at 3.

The wheel 1 has a relatively wide, flat face 4 on which is mounted a plurality of transversely spaced, circumferentially extending rows of outwardly projecting spikes 5; the spikes of each row being curved as shown and equally spaced.

The plow assembly, which is the essence of the present invention, comprises a pair of sub-soil plow units, indicated generally at 6 and 7, mounted in connection with the frame beam 3 and depending therefrom to one side of wheel 1; said plow units 6 and 7 being spaced apart lengthwise of the implement and disposed at predetermined leading and trailing points, respectively, relative to the point of ground engagement of said wheel 1.

The plow units 6 and 7 each include a vertically disposed plate-like standard 8 disposed edgewise to the direction of travel; such standard being secured at its upper end portion to an attachment member 9 secured to frame beam 3 in vertically adjustable relation by means of clamps 10. The members 9 are quite wide and the standards 8 can be adjusted thereon lengthwise of the implement. A bracing block 11 may be secured to the members along one edge or the other of the corresponding standard, to help maintain the latter in position.

The lower end portions of the standards 8 are bent laterally inward to form plow blades 12 disposed at a slight downward slope laterally and at a similar forward and downward slope lengthwise of the implement; the leading edge of such plow blades being sharpened to reduce resistance. These blades 12 project beneath the wheel 1 and the standards are of such length that the blades run below the beets in a row over which the wheel is running.

The blade 12 of the plow unit 7 includes a forwardly and downwardly projecting finger 13 sharpened on its leading end; such finger serving to effect a plowing action at a greater depth but in a path of lesser width than the corresponding blade 12.

The plow unit 6 is disposed so that the blade 12 thereof is disposed at a point a substantial distance ahead of the point of contact P of wheel 1 with the ground line G. Thus, as the implement advances along a beet row, the plow blade 12 of plow unit 6 runs beneath and loosens the soil under and about the beets in advance of the wheel 1 engaging said beets.

This produces the following advantageous result:

If a beet B has a "high crown" C, as shown in Fig. 3, the soil under and about said beet is disturbed and loosened before the beet is engaged and then as the spiked wheel engages said high crown beet, it first depresses the beet into the loosened ground until the crown C of said beet is substantially flush with the ground line G, as shown in Fig. 4.

Thereafter, with continued advance of the implement, the plow blade 12 of plow unit 7 comes into action relative to said beet B. The plow blade 12 of plow unit 7 is disposed in slightly trailing but closely adjacent relation to the vertical plane of the point P of wheel contact, so that a moment after the beet B is depressed into the loosened soil and then fully impaled on spikes 5, the plow blade 12 of plow unit 7 again disturbs the soil under and about said beet and simultaneously exerts a lifting action on the latter so that said beet readily lifts from the ground, as shown in Fig. 5, and rises away therefrom on wheel 1.

By reason of the above arrangement, substantially all beets, including those initially having high crowns, are impaled on the wheel substantially radially thereof, as is desirable for effective topping by the topping unit (not shown).

In addition, the use of plow units spaced lengthwise of the implement and disposed in leading and trailing relation to point of contact P, assures that the wheel—under the influence of the suction of said plow units—will closely follow ground contour as the implement moves forward down a beet row.

By reason of the vertical adjustability of standards 8, the plows 12 can be adjusted radially of the wheel to the most effective running depth.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A plow assembly for a beet harvester having a spiked, beet pick-up wheel adapted to ride on a beet row with advance of the harvester, said plow assembly comprising a sub-soil plow supported ahead of the point of contact of the wheel with the ground, and another sub-soil plow disposed rearwardly of said point, the leading plow being disposed so as to loosen the soil beneath the beets in the row.

2. A plow assembly for a beet harvester having a spiked, beet pick-up wheel adapted to ride on a beet row with advance of the harvester, said plow assembly comprising a sub-soil plow supported ahead of the point of contact of the wheel with the ground, and another sub-soil plow disposed rearwardly of said point, the leading plow being disposed to advance lengthwise of the row below the beets therein.

3. A plow assembly for a beet harvester having a spiked, beet pick-up wheel adapted to ride on a beet row with advance of the harvester, said plow assembly comprising a sub-soil plow supported ahead of the point of contact of the wheel with the ground, and another sub-soil plow disposed rearwardly of said point, the plows both being disposed to advance lengthwise of the row below the beets therein.

4. A plow assembly for a beet harvester having a spiked, beet pick-up wheel adapted to ride on a beet row with advance of the harvester, said plow assembly comprising a sub-soil plow supported ahead of the point of contact of the wheel with the ground, and another sub-soil plow disposed rearwardly of said point, the leading plow being disposed so as to loosen the soil beneath the beets in the row prior to engagement of the spiked wheel with said beets.

5. A plow assembly for a beet harvester having a spiked, beet pick-up wheel adapted to ride on a beet row with advance of the harvester, said plow assembly comprising a sub-soil plow supported ahead of the point of contact of the wheel with the ground, and another sub-soil plow disposed rearwardly of said point, the leading plow being disposed to advance lengthwise of the row below the beets therein to loosen the soil thereunder prior to engagement of the spiked wheel with the beets.

6. A plow assembly for a beet harvester having a spiked, beet pick-up wheel adapted to ride on a beet row with advance of the harvester, said plow assembly comprising a sub-soil plow supported ahead of the point of contact of the wheel with the ground, and another sub-soil plow disposed rearwardly of said point, the leading plow being disposed to advance lengthwise of the row below the beets therein to loosen the soil thereunder prior to engagement of the spiked wheel with the beets, and the trailing plow being disposed to exert a lifting action on the beets closely adjacent but slightly to the rear of said point of wheel contact.

7. A plow assembly for a beet harvester having a frame and a spiked, beet pick-up wheel journaled in connection with said frame and adapted to ride on a beet row with advance of the harvester; a pair of sub-soil plow units, each having a supporting standard and a plow blade on the lower end of such standard, and means mounting said standards in rigid connection with the frame; said standards being disposed so that one plow is disposed ahead of the point of contact of the wheel with the ground, and the other plow is disposed rearwardly of said point.

8. A plow assembly for a beet harvester having a frame and a spiked, beet pick-up wheel journaled in connection with said frame and adapted to ride on a beet row with advance of the harvester; a pair of sub-soil plow units, each having a supporting standard and a plow blade on the lower end of such standard, and means mounting said standards in rigid connection with the frame with one plow blade ahead and the other plow blade rearwardly of the point of contact of the wheel with the ground, said plow blades being disposed to run below beets in the row.

9. A plow assembly for a beet harvester having a frame and a spiked, beet pick-up wheel journaled in connection with said frame and adapted to ride on a beet row with advance of the harvester; a pair of sub-soil plow units, each having a supporting standard and a plow blade on the lower end of such standard, and means mounting said standards in rigid connection with the frame with one plow blade ahead and the other plow blade rearwardly of the point of contact of the wheel with the ground, said plow blades being disposed to run below beets in the row; said standards being disposed to one side of the wheel, and the plow blades projecting laterally from said standards beneath the wheel.

10. A plow assembly for a beet harvester having a frame and a spiked, beet pick-up wheel journaled in connection with said frame and adapted to ride on a beet row with advance of the harvester; a pair of sub-soil plow units, each having a supporting standard and a plow blade on the lower end of such standard, and means mounting said standards in rigid connection with the frame with one plow blade ahead and the other plow blade rearwardly of the point of contact of the wheel with the ground, said plow blades being disposed to run below beets in the row and said standards being vertically and horizontally adjustable whereby to vary the running depth and longitudinal position of said plow blades relative to each other and to said point of contact.

HENRY V. LEA.
LEWIS W. SCHMIDT.